US012792872B2

(12) United States Patent
Kim et al.

(10) Patent No.: US 12,792,872 B2
(45) Date of Patent: Nov. 10, 2026

(54) DEVICE AND METHOD FOR LEARNING REPRESENTATIONS USING SPHERIZATION LAYER

(71) Applicant: Gwangju Institute of Science and Technology, Gwangju (KR)

(72) Inventors: Ho Yong Kim, Gwangju (KR); Kang il Kim, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 467 days.

(21) Appl. No.: 18/520,672

(22) Filed: Nov. 28, 2023

(65) Prior Publication Data

US 2024/0311610 A1 Sep. 19, 2024

(30) Foreign Application Priority Data

Mar. 16, 2023 (KR) ........................ 10-2023-0034301

(51) Int. Cl.
*G06N 3/04* (2023.01)

(52) U.S. Cl.
CPC ...................................... *G06N 3/04* (2013.01)

(58) Field of Classification Search
CPC ........................................................ G06N 3/04
See application file for complete search history.

(56) References Cited

U.S. PATENT DOCUMENTS

2020/0160501 A1* 5/2020 Liao ....................... G06N 3/084

OTHER PUBLICATIONS

Iwamoto, Ran, Ryosuke Kohita, and Akifumi Wachi. "Polar embedding." In Proceedings of the 25th Conference on Computational Natural Language Learning, pp. 470-480. 2021. (Year: 2021).*
Liu, Weiyang, Yandong Wen, Zhiding Yu, Ming Li, Bhiksha Raj, and Le Song. "Sphereface: Deep hypersphere embedding for face recognition." In Proceedings of the IEEE conference on computer vision and pattern recognition, pp. 212-220. 2017. (Year: 2017).*
Y. Lecun et al., "Gradient-based learning applied to document recognition", In Proceedings of the IEEE, 1998, vol. 86, No. 11, DOI:10.1109/5.726791, p. 2278-2324.
W. Liu et al., "Deep Hyperspherical Learning", 31st Conference on Neural Information Processing Systems, 2017.
W. Liu et al., "Decoupled Networks", arXiv:1804.08071v1 [cs.CV], Apr. 22, 2018, https://doi.org/10.48550/arXiv.1804.08071, pp. 2771-2779.

* cited by examiner

*Primary Examiner* — Casey R. Garner
(74) *Attorney, Agent, or Firm* — Revolution IP, PLLC

(57) ABSTRACT

The present invention relates to representation learning in an artificial neural network, and more specifically, to a device and method for learning representations using a spherization layer, which places all hidden vectors on a hyperspherical surface, and learns representations using only angles on the basis of hyperplanes fixed to the origin. According to an embodiment of the present invention, as all hidden vectors are represented on a hypersphere in a space of one dimension higher, and representation learning is performed thereon using only angles through the hyperplanes fixed to the origin, the problem of performance degradation of artificial neural networks can be solved by ensuring that all information learned by the artificial neural network from input data is contained in the angle without loss.

11 Claims, 9 Drawing Sheets

FIG. 8

| Network | Dataset | Reference | | Reproduced | | Spherized | |
|---|---|---|---|---|---|---|---|
| | | train | test | train | test | train | test |
| SimpleFNN [8] | MNIST | – | 98.47 | 99.99±0.01 | 98.58±0.03 | 99.99±0.01 | **98.65±0.04** |
| LeNet-5 [11] | | – | 99.05 | 99.55±0.09 | 99.10±0.05 | 99.79±0.09 | **99.14±0.04** |
| VGG-11 [33] | F-MNIST | – | 94.70 | 99.24±0.18 | **94.36±0.06** | 98.92±0.36 | 94.34±0.17 |
| | CIFAR10 | – | 90.90 | 100.00±0.00 | 92.38±0.06 | 100.00±0.00 | **92.49±0.11** |
| | CIFAR100 | – | 66.80 | 99.71±0.03 | 68.42±0.12 | 99.82±0.02 | **69.03±0.24** |

FIG. 9

| Depth | Width | Reference | | Reproduced | | Spherized | |
|---|---|---|---|---|---|---|---|
| | | train | test | train | test | train | test |
| VGG-11 | 16/32/64/128 | – | – | 79.23±5.94 | 60.17±0.21 | 77.48±5.60 | **60.40±0.35** |
| | 32/64/128/256 | – | – | 98.34±0.37 | 64.89±0.38 | 96.98±3.67 | **65.38±0.28** |
| | 64/128/256/512 | – | – | 99.71±0.03 | 68.42±0.12 | 99.82±0.02 | **69.03±0.24** |
| | 128/256/512/1024 | – | – | 99.90±0.00 | 70.53±0.35 | 99.93±0.00 | **69.03±0.19** |
| | 256/512/1024/1024 | – | – | 99.90±0.01 | 71.43±0.22 | 99.93±0.01 | **71.94±0.19** |
| VGG-11 | 64/128/256/512 | – | 68.64 | 99.71±0.03 | 68.42±0.12 | 99.82±0.02 | **69.03±0.24** |
| VGG-16 | | – | 72.93 | 99.39±0.07 | 72.51±0.26 | 99.54±0.05 | **72.53±0.17** |
| VGG-19 | | – | 72.23 | 97.95±0.81 | 71.53±0.32 | 99.30±0.06 | **72.17±0.33** |

(a) Original 2D (b) Original 3D (c) Spherized 3D

FIG. 12

| Model | SAT | U2 | U4 | Google | BATS | Avg. |
|---|---|---|---|---|---|---|
| BERT | **29.4**/28.5/**28.8** | 36.0/36.0/**36.8** | **38.7**/34.7/34.3 | **33.0/33.8/33.0** | 32.3/**35.0**/33.2 | **33.9**/33.6/**33.2** |
| BERT + sph | 29.1/**29.4**/27.9 | **37.3/39.0**/36.0 | 36.8/**35.9/35.4** | 32.4/32.6/32.2 | **34.0**/34.2/**33.8** | **33.9/34.2**/33.1 |
| RoBERTa | **29.4/31.2**/29.7 | 35.5/**35.5/36.4** | 33.6/**34.3/34.5** | 32.8/33.2/30.8 | 30.9/31.6/30.9 | 32.4/33.1/32.5 |
| RoBERTa + sph | 29.1/29.4/**30.0** | **36.4/35.5**/34.2 | **34.0/34.3**/33.3 | **34.2/33.6/32.8** | **35.0/33.9/34.8** | **33.7/33.3/33.0** |

FIG. 13

| Model | Test Acc. | | Model | Test Acc. | |
|---|---|---|---|---|---|
| | Euclideam | Cosine | | Euclideam | Cosine |
| ConvNet | 50.29±0.18 | 52.87±0.18 | ResNet | 37.63±0.15 | 33.41±0.15 |
| ConvNet + sph | 43.41±0.16 | **53.74±0.16** | ResNet + sph | 31.77±0.13 | **38.71±0.16** |

DEVICE AND METHOD FOR LEARNING REPRESENTATIONS USING SPHERIZATION LAYER

BACKGROUND OF THE INVENTION

Field of the Invention

The present invention relates to representation learning in an artificial neural network, and more specifically, to a device and method for learning representations using a spherization layer, which places all hidden vectors on a hyperspherical surface, and learns representations using only angles on the basis of hyperplanes fixed to the origin.

Background of the Related Art

Generally, learning in an artificial neural network is accomplished through inner product. The artificial neural network learns information from input data through inner product and expresses each data in a representation space. Such a series of processes is called representation learning, and performance in image classification or the like, which is a core technique in the AI field, is determined by how accurately the representations are learned.

The inner product is configured of the Euclidean norm (e.g., $\|w_i\|\|x_i$ for weight vectors and hidden vectors and the angle (e.g., $\cos \theta_{i,j}$) between the two vectors. Accordingly, information learned by the artificial neural network is dispersed to various factors, such as the Euclidean norm and the angle, interactions between the two, and the like. However, when a method that uses only angles such as cosine similarity, among the similarity measurement methods that utilize representation learning, is applied to the representations learned through the inner product, there is a risk of losing information included in the parts other than the angles, and this may lower performance of the artificial neural network.

(Non-patent document 0001) Y. Lecun, L. Bottou, Y. Bengio and P. Haffner, Gradient-based learning applied to document recognition, In Proceedings of the IEEE, 1998, Vol. 86, No. 11, DOI: 10.1109/5.726791, P 2278-2324

(Non-patent document 0002) W. Liu, et al., Deep Hyperspherical Learning, 31st Conference on Neural Information Processing Systems, 2017.

SUMMARY OF THE INVENTION

Therefore, the present invention has been made in view of the above problems, and it is an object of the present invention to provide a device and method for learning representations using a spherization layer, which learns representations using only angles by applying all learning information to the angles without loss so that information loss or performance degradation may not occur.

The technical problems to be solved by the present invention are not limited to the technical problems mentioned above, and other unmentioned technical problems may be clearly understood by those skilled in the art from the following description.

To accomplish the above object, according to one aspect of the present invention, there is provided a representation learning device using a spherization layer.

The representation learning device using a spherization layer according to an embodiment of the present invention may include an angularization unit for converting all values of a hidden vector into an angle vector within a specific range; a conversion unit for converting the angle vector into a hidden vector on a hyperspherical plane; and a learning unit for learning representations of the hidden vector using only angles.

According to another aspect of the present invention, there is provided a method of learning representations using a spherization layer and a computer program for executing the same.

The method of learning representations using a spherization layer according to an embodiment of the present invention and the computer program for executing the same may include the steps of: converting all values of a hidden vector into an angle vector within a specific range; converting the angle vector into a hidden vector on a hyperspherical plane; and learning representations of the hidden vector.

BRIEF DESCRIPTION OF THE DRAWINGS

FIGS. 7 to 13 are example views showing results of experiments performed using a representation learning device using a spherization layer according to an embodiment of the present invention.

DETAILED DESCRIPTION OF THE PREFERRED EMBODIMENT

Figure 1:
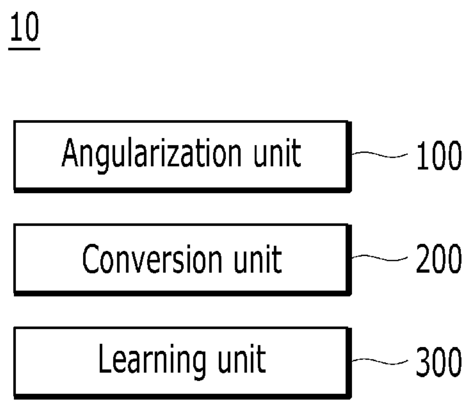
FIGS. 1 to 5 are views for explaining a representation learning device using a spherization layer according to an embodiment of the present invention.

Since the present invention may make various changes and have various embodiments, specific embodiments will be illustrated in the drawings and described in detail through detailed description. However, it should be understood that this is not intended to limit the present invention to the specific embodiments, but to include all changes, equivalents, and substitutes included in the spirit and technical scope of the present invention. When it is determined in describing the present invention that detailed description of related known techniques may unnecessarily obscure the gist of the present invention, the detailed description will be omitted. In addition, it should be construed that singular expressions used in the specification and claims generally mean “one or more” unless mentioned otherwise.

Hereinafter, preferred embodiments of the present invention will be described in detail with reference to the accompanying drawings, and in describing with reference to the accompanying drawings, the same reference numerals will be assigned to the same or corresponding components, and duplicate descriptions thereof will be omitted.

The present invention may capture all learning information into angles without loss by using a spherization layer that can represent all information about angular similarity.

FIGS. 1 to 5 are views for explaining a representation learning device using a spherization layer according to an embodiment of the present invention.

Referring to FIG. 1, a representation learning device 10 using a spherization layer includes an angularization unit 100, a conversion unit 200, and a learning unit 300.

The angularization unit 100 may convert all values of a hidden vector generated in the previous hidden layer into an angle vector within a specific range. Describing in detail, the angularization unit 100 may convert a hidden vector generated in the previous hidden layer into an angle vector having an angle value within a valid range using learning parameters and a lower bound.

Figure 2:
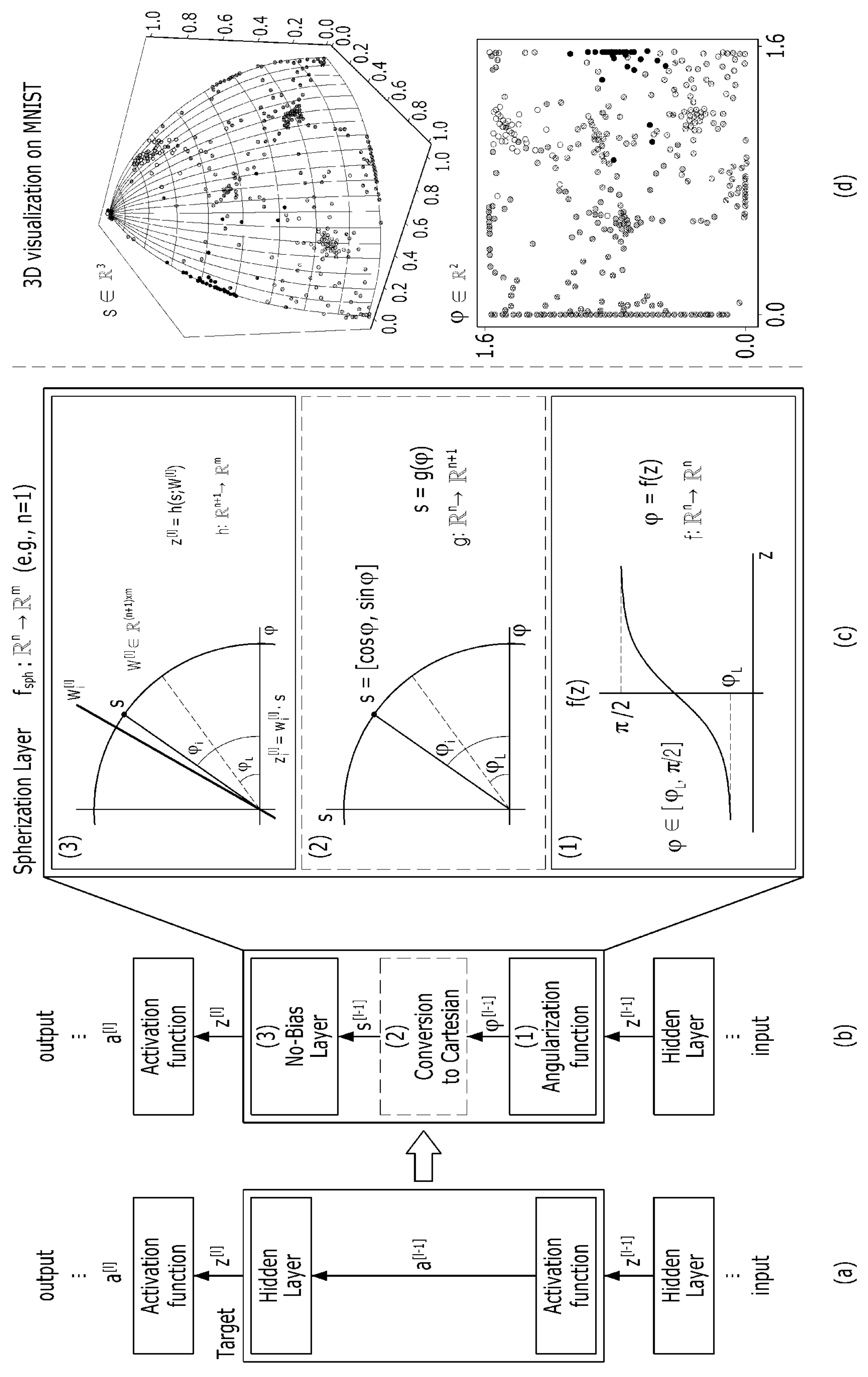

FIG. 2(*a*) is a view showing a conventional layer that uses an activation function for a pre-activation value.

Referring to FIG. 2(*b*), the angularization unit 100 may perform angularization on the basis of the angularization function instead of the activation function for the pre-activation value of the (l−1)-th layer.

The angularization unit 100 may convert an input vector, which is a pre-activation value, into angular coordinates on the basis of the angularization function.

FIG. 2(*c*) graphically shows the relationship between the input and the output in each process, and this will be described in detail in FIGS. 3 to 5.

Figure 3:
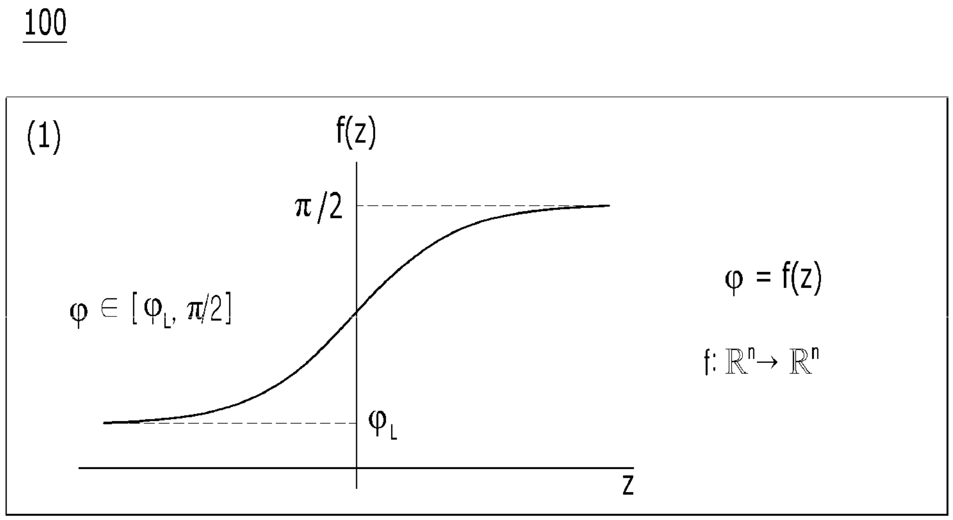

The example in FIG. 3 is an example of a relationship graph between the input and the output of the angularization unit 100, and may be clearly defined in [Equation 1].

The angularization unit 100 may map vector z configured of the pre-activation value of the (l−1)-th layer to angular coordinates ϕ as shown in [Equation 1].

$$\varphi = f(z), \quad f: \mathbb{R}^n \to \mathbb{R}^n \qquad \text{[Equation 1]}$$

n: Dimension of pre-activation vector

Referring to FIG. 3, the angularization unit 100 may configure the shape of a mapped region on the (n+1) spherical surface to resolve the training and computational difficulty.

The angularization unit 100 has an angularization function *f*, which is a function for converting a pre-activation vector into an angle vector, and may be implemented by applying an element-wise function to all coordinates of z as shown in [Equation 2].

$$f(z) = \left(\frac{\pi}{2} - \varphi_L\right) \cdot \sigma(\alpha \cdot z) + \varphi_L \qquad \text{[Equation 2]}$$

The angularization unit 100 may limit the range of angularization function *f* to [0, π/2] to guarantee the conversion as bijective mapping of one-to-one correspondence. Describing in detail, the angularization unit 100 may use the sigmoid function σ(·) together with weight π/2 for range setting in order to represent all input vectors without loss in the domain of real number.

After converting the pre-activation vector into angular coordinates using the angularization function, the present invention may position the representations on the hyperspherical surface in the same range by setting a consistent radius for all inputs. At this point, the radius scale may be controlled in the event of conversion to Cartesian coordinates.

The conversion unit 200 may convert the angle vector into a hidden vector. Numerous sine values are multiplied in the process of converting the angle vector to a hidden vector, and at this point, in order to prevent a phenomenon of decreasing the value too small, the angularization unit 100 may set a lower bound for the angle value. This is since that when converting angular coordinates into Cartesian coordinates, the final coordinates may be an extremely small value as the trigonometric values of [0, 1] are multiplied several times. Accordingly, the angularization unit 100 may set the lower bound ϕL of angles using [Equation 3] to guarantee distinguishable values in the converted Cartesian coordinates.

$$\varphi_L = \sin^{-1}\left(\delta^{\frac{1}{n}}\right) \qquad \text{[Equation 3]}$$

In [Equation 3], δ is a minimal trigonometric value for guaranteeing the distinguishable representations. For example, the angularization unit 100 may set δ to an appropriate value of $10^{-6}$.

The angularization unit 100 may apply a sigmoid function after determining the lower bound, and adjust the magnitude of the function value through a learnable parameter.

The angularization unit 100 may set learnable parameter α as the weight of z that controls variance of z. Describing in detail, the variance may be reduced as the activations are concentrated in a small region due to the lower bound of angles, and since training may be difficult as the variance decreases, the angularization unit 100 may use parameter α. The angularization unit 100 may make the angular representations abundant using parameter α.

The conversion unit 200 may convert the angular coordinates into Cartesian coordinates on the (n+1) spherical surface. Describing in detail, the conversion unit 200 may convert an n-dimensional angle vector into a hidden vector on the (n+1)-dimensional hyperspherical plane using a tensor through a calculation trick.

Figure 4:
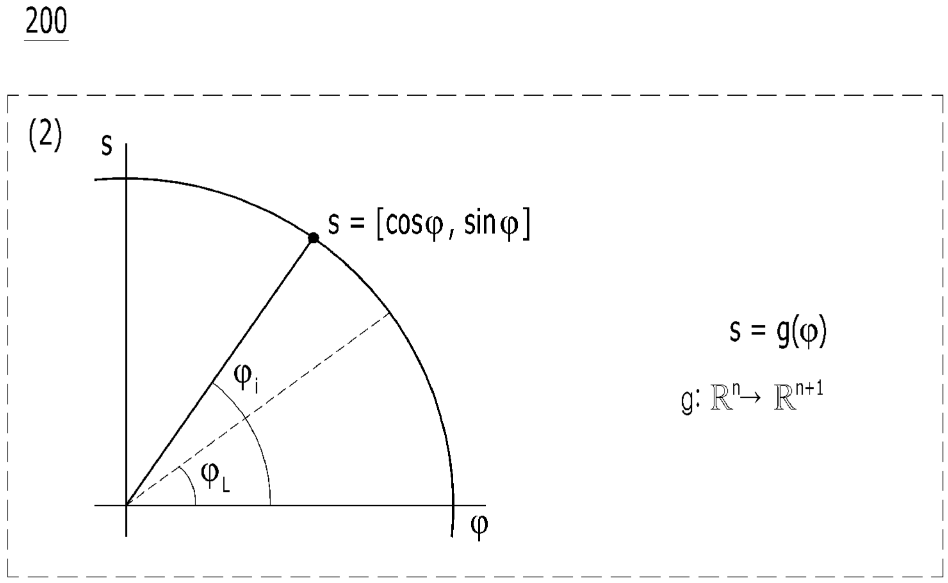

The example in FIG. 4 is an example of a relationship graph between the input and the output of the conversion unit 200, and may be clearly defined in [Equation 4].

$$S = g(\varphi), \quad g: \mathbb{R}^n \to \mathbb{R}^{n+1} \qquad \text{[Equation 4]}$$

The conversion unit 200 may guarantee consistency between the output (polar coordinate system) of the angularization unit 100 and the input (Cartesian coordinate system) of a no-bias layer, and allows the layer to be trained in the same manner as general neural networks.

The conversion unit 200 may set an additional dimension so that the spherization layer may have sufficient capacity to be compatible with an ordinary layer.

The conversion unit 200 has a modified range of angles as shown in [Equation 5].

$$g(\varphi) = \left[r\cos\varphi_1, \ldots, r\cos\varphi_k \Pi_{i=1}^{k-1}\sin\varphi_i, \ldots, r\Pi_{i=1}^{n}\sin\varphi_i\right], \quad \varphi_i \in \left[\varphi_L, \frac{\pi}{2}\right] \qquad \text{[Equation 5]}$$

The conversion unit 200 may use a conventional conversion method of converting a polar coordinate system into a Cartesian coordinate system. At this point, since the conventional conversion method has a disadvantage as it difficult to utilize a tensor, which is in an important variable type, in implementing an artificial neural network using a programming language, the conversion unit 200 may implement a tensor operation using a calculation trick shown in [Equation 6].

(Stage 1) [Equation 6]

$$\vec{\phi} = \overrightarrow{W}_{\psi}^{T} \vec{\psi}$$

(Stage 2)

$$\vec{s} = r \cdot \exp\left(\overrightarrow{W}_{\phi}^{T} \ln(\sin \phi) + \ln\left(\cos\left(\vec{\phi} + \vec{b}_{\phi}\right)\right)\right)$$

$\phi$: Dimension-expanded vector in $\mathbb{R}^{n+1}$ r: Constant that controls radius $W_{\psi}$: Constant matrix and vector of $\mathbb{R}^{n\times(n+1)}$ $W_{\phi}$: Constant matrix and vector of $\mathbb{R}^{(n+1)\times(n+1)}$ $b_{\phi}$: Constant matrix and vector of $\mathbb{R}^{(n+1)}$ The present invention may place all representations on the (n+1) spherical surface through angularization and Cartesian coordinate conversion through the angularization unit 100 and the conversion unit 200.

FIG. 2(*d*) shows an example of generating angular coordinates and converting the angular coordinates into Cartesian coordinates in a 3-dimensional space on MNIST.

The learning unit 300 may perform no-bias training on the feature vector converted into Cartesian coordinates on the (n+1) spherical surface. The learning unit 300 may learn the hidden vector extracted as a feature vector by using only angles. The learning unit 300 may learn the representations of the hidden vector using hyperplanes fixed to the origin.

Figure 5:
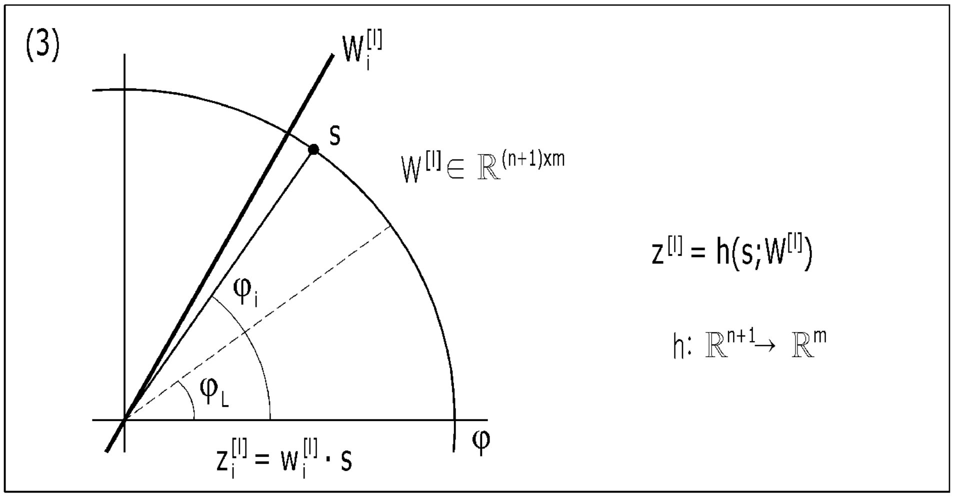

The example in FIG. 5 is an example of a relationship graph between the input and the output of the learning unit 300, and may be clearly defined in [Equation 7].

$$z^{[l]} = h(s), \quad h: \mathbb{R}^{n+1} \rightarrow \mathbb{R}^{m}$$ [Equation 7]

The learning unit 300 may learn the representations of the hidden vector on the spherical surface using hyperplanes fixed to the origin with no bias. For example, the learning unit 300 may perform no-bias training using weight parameter $W^{[l]}$ as shown in [Equation 8] to synchronize the parameters.

$$z^{[l]} = W^{[l]T} s$$ [Equation 8]

In an ordinary layer, the problem of no-bias is that hyperplanes passing through the origin may not be shifted to another parallel hyperplane. However, since the present invention places all feature vectors on the (n+1) spherical surface, the learning unit 300 may shift the decision boundary by only changing the angle when the (n+1)-dimensional plane passes through the origin on the basis of no-bias layer.

The learning unit 300 may perform representation learning that uses only angles, using hyperplanes fixed to the origin on the basis of no-bias layer.

In the present invention, since all hidden vectors are on the spherical surface and the hyperplanes are also fixed to the origin, representation learning may be performed using only angles, and thus all learning information may be included in the angles.

Figure 6:
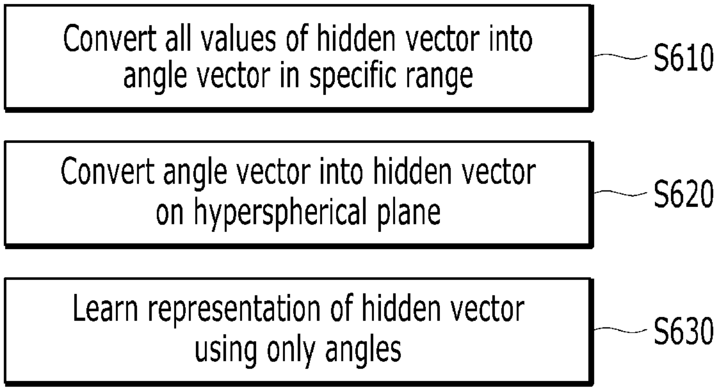
FIG. 6 is a flowchart illustrating a method of learning representations using a spherization layer according to an embodiment of the present invention.

FIG. 6 is a flowchart illustrating a method of learning representations using a spherization layer according to an embodiment of the present invention. Although each of the processes described below is a process performed by each functional unit constituting the representation learning device using a spherization layer in each stage, the subject of each stage is generally referred to as a representation learning device using a spherization layer for a concise and clear explanation of the present invention.

Referring to FIG. 6, at step S610, the representation learning device 10 using a spherization layer may convert all pre-activation values of a hidden vector generated from the previous hidden layer into angle values within a specific range. The representation learning device 10 using a spherization layer may convert the pre-activation vector of the vector of the previous hidden layer into an angle vector. The representation learning device 10 using a spherization layer may perform angularization using an angularization function. The representation learning device 10 using a spherization layer may convert the hidden vector generated from the previous hidden layer into an angle vector having angle values within an effective range using learning parameters and a lower bound.

At step S620, the representation learning device 10 using a spherization layer may convert the angle vector into a hidden vector on a hyperspherical plane. The representation learning device 10 using a spherization layer may convert the angular coordinates of the converted feature vector into a Cartesian coordinate system. The representation learning device 10 using a spherization layer may convert the angular coordinates into Cartesian coordinates on the (n+1) spherical surface. Describing in detail, the representation learning device 10 using a spherization layer may convert an n-dimensional angle vector into a hidden vector on the (n+1)-dimensional hyperspherical plane using a tensor through a calculation trick. The representation learning device 10 using a spherization layer may place all representations on the (n+1) spherical surface through the Cartesian coordinate conversion.

At step S630, the representation learning device 10 using a spherization layer may learn representations of the hidden vector using only angles. The representation learning device 10 using a spherization layer may perform representation learning that uses only angles, using hyperplanes fixed to the origin on the basis of no-bias layer. The representation learning device 10 using a spherization layer may place all feature vectors on the (n+1) spherical surface, and shift the decision boundary only by changing the angles when the (n+1)-dimensional plane passes through the origin using no-bias layers. The representation learning device 10 using a spherization layer may perform representation learning by training a hyperplane decision boundary that passes through the origin.

FIGS. 7 to 13 are example views showing results of experiments performed using a representation learning device using a spherization layer according to an embodiment of the present invention.

Figure 7:
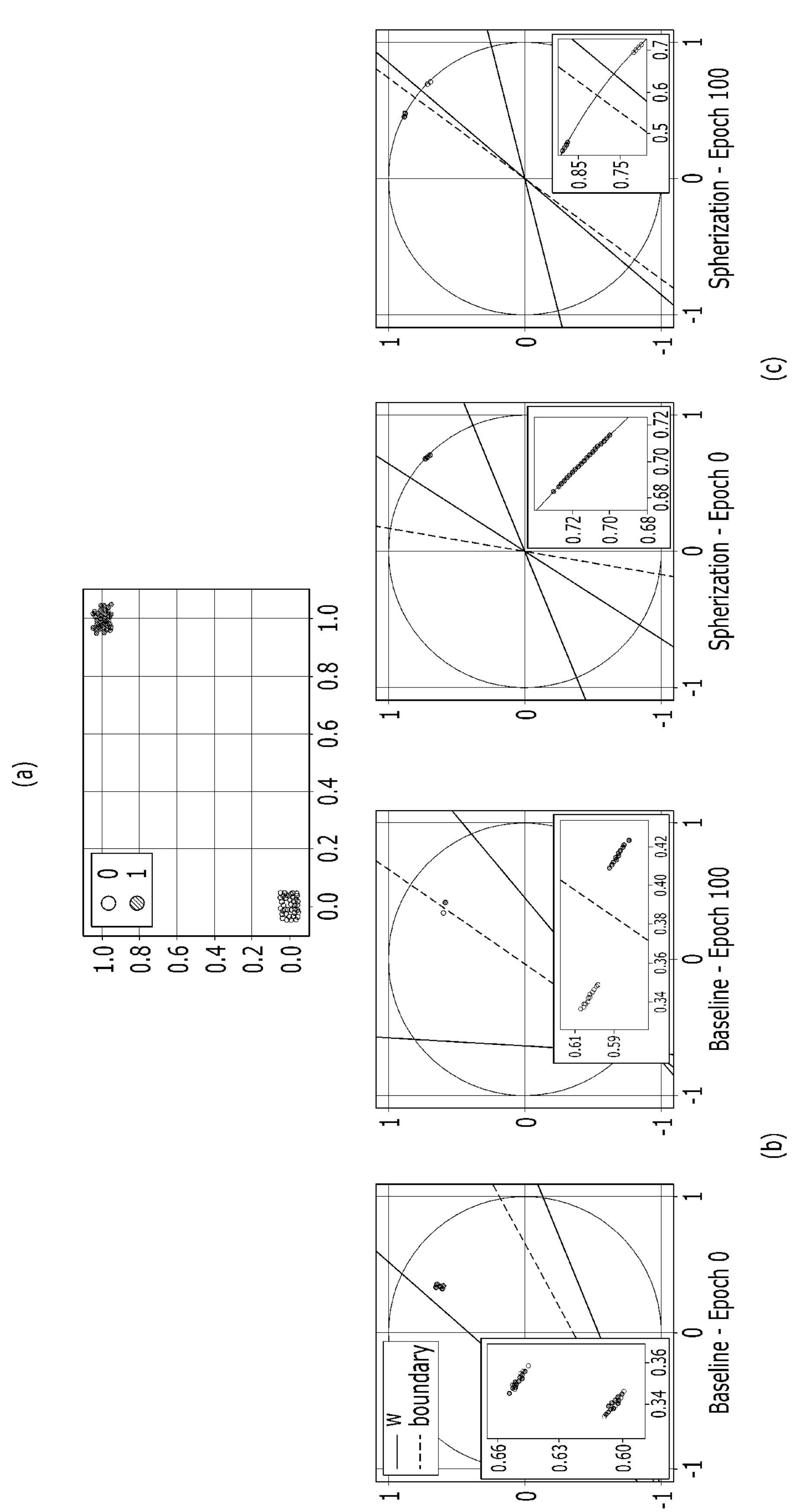

Referring to FIG. 7, it can be seen that the spherization layer (FIG. 7(*c*)) of the present invention that finds all representations on the 2-spherical surface in both the initial and final epochs, whereas the conventional layer (FIG. 7(*b*)) spreads them out.

Describing in detail, it shows a result of randomly generating one hundred input samples (○) placed around (0, 0) for label 0, and other one hundred samples (●) around (1, 1) for label 1 as shown in FIG. 7(*a*), and performing representation learning by the existing ordinary layer (FIG. 7(*b*)) and the spherization layer of the present invention (FIG. 7(*c*)).

Referring to FIG. 8, the present invention shows the highest accuracy among all models as a result of representation learning for image classification using various data sets and models.

Figure 10:
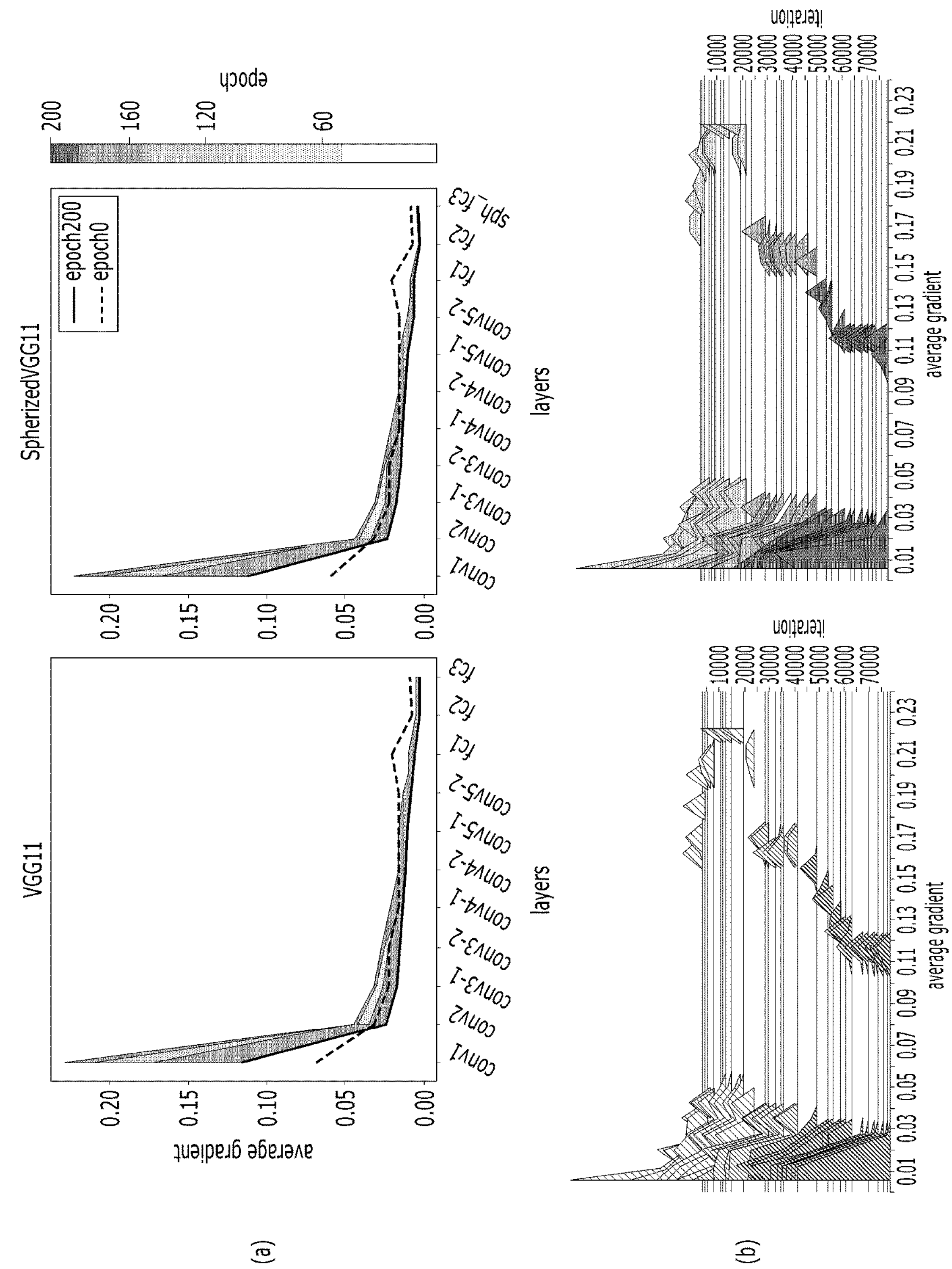

FIGS. 9 and 10 show examples of results of representation learning for image classification using CIFAR100 with various network widths and depths set therein, and FIG. 10 shows an example of analyzing gradient flow of an image classification model using CIFAR100.

Referring to FIG. 9, as a result of representation learning for image classification using CIFAR100 with various network widths and depths set therein, the present invention shows the highest accuracy among all models.

Referring to FIG. 10(*a*), the y-axis means the average of absolute gradients occurring in each layer. The left side of FIG. 10(*a*) shows the gradient flow in VGG-11 (VGG11), and the right side shows the gradient flow of spherized VGG-11 (SpherizedVGG11), in which the last fully connected layer is substituted with a spherization layer, which is a spherized layer.

The histogram on the left side of FIG. 10(*b*) shows the frequency of the average of absolute gradients in VGG-11, and the histogram on the right side shows the frequency of the average of absolute gradients in spherized VGG-11.

As shown in FIG. 10, since the absolute gradient average of an ordinary layer is not significantly different from that of the spherization layer, the spherization layer does not affect the gradient flow.

Figure 11:
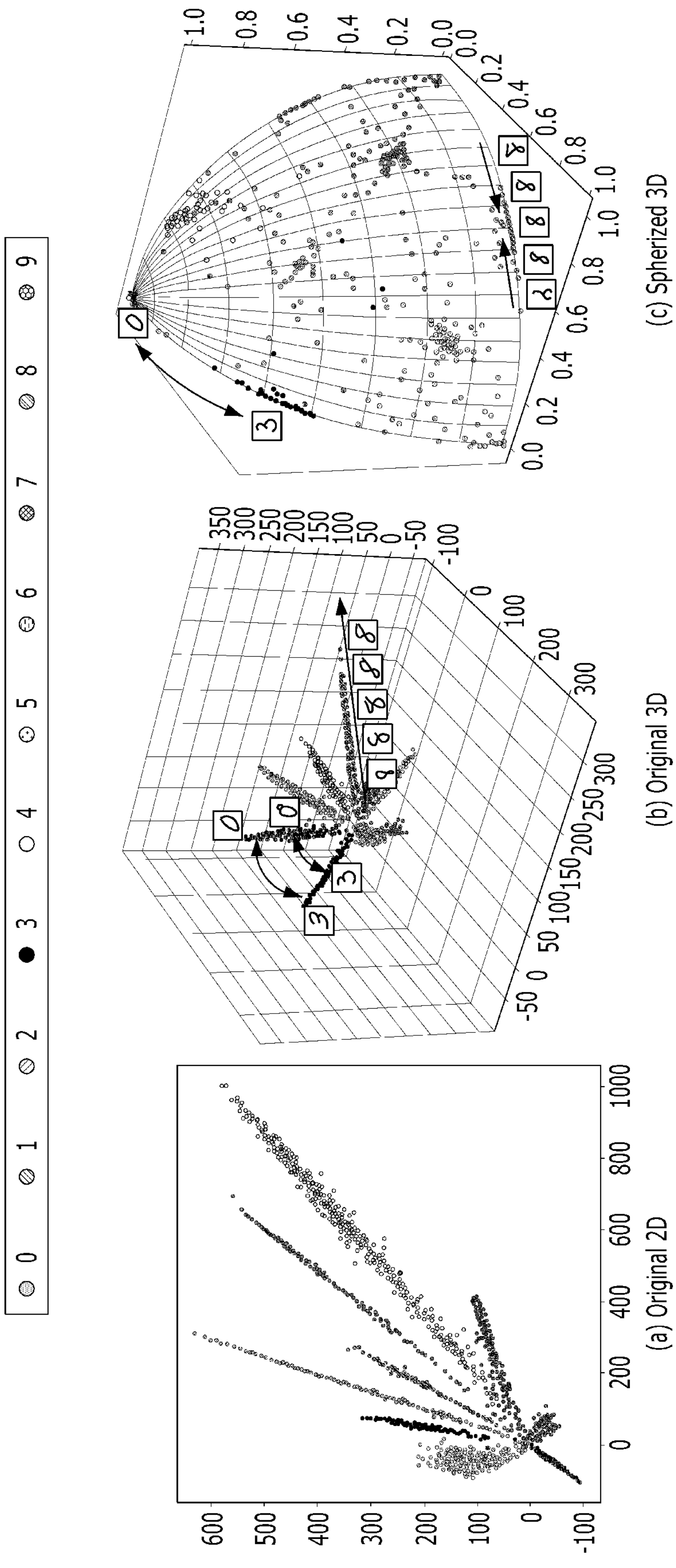

FIG. 11 shows examples of visualization graphs of feature vectors on MINST. FIGS. 11(*a*) and 11(*b*) show visualization of 2D and 3D feature vectors using an ordinary layer, respectively, and FIG. 11(*c*) is a result of visualization using a spherization layer.

FIG. 12 is an example of downstream task performance in word analogy tests and few-shot learning.

FIG. 12 is an example of performance evaluated with three matrices, and it can be seen that most average scores are improved when the spherization layer is applied to BERT and RoBERTa.

The example in FIG. 13 shows the performance result of few-shot learning, and it can be seen that performance of a network model using a spherization layer with cosine similarity is the best.

Through the experiment in FIGS. 12 and 13, the spherization layer is very useful for angle-based matric such as cosine similarity.

In addition, the present invention may convert feature vectors focused on angles without information loss by using a spherization layer.

In addition, the present invention may find input vectors on the hyperspherical surface without overlapping problems by using a spherization layer.

According to an embodiment of the present invention, as the dimension is expanded by representing all hidden vectors on the hypersphere in a space of one dimension higher, the hidden vectors may be represented on a hyperspherical surface without loss of information.

In addition, according to an embodiment of the present invention, as representation learning is performed using only angles through the hyperplanes fixed to the origin with no-bias, the problem of performance degradation of artificial neural networks can be solved by ensuring that all information learned by the artificial neural network from input data is contained in the angle without loss.

The effects of the present invention are not limited to the effects described above, and it should be understood that the effects include all effects that can be inferred from the configuration of the invention described in the description or claims of the present invention.

The method of learning representations using a spherization layer described above can be implemented as a computer-readable code on a computer-readable medium. The computer-readable recording medium may be, for example, a portable recording medium (CD, DVD, Blu-ray disk, USB storage device, portable hard disk) or a fixed recording medium (ROM, RAM, computer-equipped hard disk). The computer program recorded on the computer-readable recording medium may be transmitted to another computing device through a network such as the Internet to be installed thereon, and thus may be used on another computing device.

Although all the components constituting the embodiment of the present invention have been described above as being combined or operated in combination, the present invention is not necessarily limited to this embodiment. That is, one or more among the components may be selectively combined to operate within the scope of the purpose of the present invention.

Although the operations are shown in a specific order in the drawings, it should not be understood that the operations should be performed in the specific order shown in the drawings or in a sequential order or that all the operations shown in the drawings should be performed to obtain a desired result. In a specific situation, multitasking and parallel processing may be advantageous. Moreover, it should not be understood that separation of various configurations in the embodiments described above is necessarily required, and it should be understood that the program components and systems described above may generally be integrated together as a single software product or may be packaged into a plurality of software products.

So far, the present invention has been described focusing on the embodiments. Those skilled in the art will understand that the present invention may be implemented in a modified form without departing from the essential characteristics of the present invention. Therefore, the disclosed embodiments should be considered from an illustrative point of view, rather than a restrictive point of view. The scope of the present invention is presented in the claims rather than the description described above, and all differences within the equivalent scope should be construed as being included in the present invention.

DESCRIPTION OF SYMBOLS

10: Representation learning device using a spherization layer
100: Angularization unit
200: Conversion unit
300: Learning unit

What is claimed is:

1. A representation learning device for training a neural network, the device comprising:

an angularization unit with a processor configured to convert all values of a hidden vector generated in a previous hidden layer of the neural network into an angle vector within a specific range, wherein the angularization unit sets a lower bound $\phi_L$ of the angle vector according to Equation 3 below as a function of a dimension n of the hidden vector;

a conversion unit with a processor configured to convert the angle vector into a hidden vector on an (n+1)-dimensional hyperspherical plane by applying a differentiable tensor operation according to Equation 6 below, the differentiable tensor operation comprising a matrix multiplication, an element-wise logarithm, an element-wise trigonometric function, and an element-wise exponentiation; and a learning unit with a processor configured to learn representations of the hidden vector using only angles, wherein the learning unit applies a weight matrix $W^{[l]}$ excluding any bias parameter to the hidden vector on the (n+1)-dimensional hyperspherical plane such that a decision boundary defined by a hyperplane passing through an origin in an (n+1)-dimensional space is shifted by an angular change of the hidden vector on the (n+1)-dimensional hyperspherical plane, wherein:

$$\varphi_L = \sin^{-1}\left(\delta^{\frac{1}{n}}\right) \quad \text{[Equation 3]}$$

where δ is a minimal trigonometric value for guaranteeing distinguishable representations and n is the dimension of the hidden vector; and $$\text{Stage 1: } \vec{\phi} = \overrightarrow{W}_{\psi}^{T}\vec{\psi} \quad \text{[Equation 6]}$$

$$\text{Stage 2: } \vec{s} = r \cdot \exp\left(\overrightarrow{W}_{\phi}^{T}\ln(\sin\phi) + \ln\left(\cos\left(\vec{\phi} + \vec{b}_{\phi}\right)\right)\right)$$

where ψ is the angle vector, ϕ is a dimension-expanded vector in $\mathbb{R}^{n+1}$, r is a constant that controls a radius, $W_\psi$ is a constant matrix of $\mathbb{R}^{n\times(n+1)}$, $W_\phi$ is a constant matrix of $\mathbb{R}^{(n+1)\times(n+1)}$, $b_\phi$ is a constant vector of $\mathbb{R}^{(n+1)}$, and s is the hidden vector on the (n+1)-dimensional hyperspherical plane.

2. The device according to claim 1, wherein the angularization unit uses an angularization function when converting a pre-activation vector into the angle vector.

3. The device according to claim 1, wherein the angularization unit sets a lower bound of the angle vector.

4. The device according to claim 1, wherein the conversion unit uses a conversion method of converting a polar coordinate system into a Cartesian coordinate system.

5. The device according to claim 1, wherein the learning unit learns the representations using only angles by using hyperplanes fixed to the origin with no-bias, wherein the learning unit performs no-bias training using the weight matrix $W^{[l]}$ according to Equation 8 below, and wherein the decision boundary shifts by the angular change of the hidden vector on the (n+1)-dimensional hyperspherical plane when the hyperplane passes through the origin in the (n+1)-dimensional space:

$$z^{[l]} = W^{[l]T}s \quad \text{[Equation 8]}$$

where $z^{[l]}$ is an output of a no-bias layer of the learning unit, and s is the hidden vector on the (n+1)-dimensional hyperspherical plane output from the conversion unit.

6. A representation learning method for training a neural network, the method comprising:

converting all values of a hidden vector generated in a previous hidden layer of the neural network into an angle vector within a specific range, including setting a lower bound $\phi_L$ of the angle vector according to Equation 3 below as a function of a dimension n of the hidden vector;

converting the angle vector into a hidden vector on an (n+1)-dimensional hyperspherical plane by applying a differentiable tensor operation according to Equation 6 below, the differentiable tensor operation comprising a matrix multiplication, an element-wise logarithm, an element-wise trigonometric function, and an element-wise exponentiation; and learning representations of the hidden vector-using only angles, including applying a weight matrix $W^{[l]}$ excluding any bias parameter to the hidden vector on the (n+1)-dimensional hyperspherical plane such that a decision boundary defined by a hyperplane passing through an origin in an (n+1)-dimensional space is shifted by an angular change of the hidden vector on the (n+1)-dimensional hyperspherical plane, wherein:

$$\varphi_L = \sin^{-1}\left(\delta^{\frac{1}{n}}\right) \quad \text{[Equation 3]}$$

where δ is a minimal trigonometric value for guaranteeing distinguishable representations and n is the dimension of the hidden vector; and $$\text{Stage 1: } \vec{\phi} = \overrightarrow{W}_{\psi}^{T}\vec{\psi} \quad \text{[Equation 6]}$$

$$\text{Stage 2: } \vec{s} = r \cdot \exp\left(\overrightarrow{W}_{\phi}^{T}\ln(\sin\phi) + \ln\left(\cos\left(\vec{\phi} + \vec{b}_{\phi}\right)\right)\right)$$

where ψ is the angle vector, ϕ is a dimension-expanded vector in $\mathbb{R}^{n+1}$, r is a constant that controls a radius, $W_\psi$ is a constant matrix of $\mathbb{R}^{n\times(n+1)}$, $W_\phi$ is a constant matrix of $\mathbb{R}^{(n+1)\times(n+1)}$, $b_\phi$ is a constant vector of $\mathbb{R}^{(n+1)}$, and s is the hidden vector on the (n+1)-dimensional hyperspherical plane.

7. The method according to claim 6, wherein the converting all values of the hidden vector uses an angularization function when converting a pre-activation vector into the angle vector.

8. The method according to claim 6, wherein the converting all values of the hidden vector includes setting a lower bound of the angle vector.

9. The method according to claim 6, wherein the converting the angle vector into the hidden vector on the (n+1)-dimensional hyperspherical plane includes converting angular coordinates of a feature vector into a Cartesian coordinate system.

10. The method according to claim 6, wherein the learning representations of the hidden vector includes learning the representations using only angles by using hyperplanes fixed to the origin with no bias, including performing no-bias training using the weight matrix $W^{[l]}$ according to Equation 8 below, wherein the decision boundary shifts by the angular change of the hidden vector on the (n+1)-dimensional hyperspherical plane when the hyperplane passes through the origin in the (n+1)-dimensional space:

$$z^{[l]} = W^{[l]T}s \quad \text{[Equation 8]}$$

where $z^{[l]}$ is an output of a no-bias layer, and s is the hidden vector on the (n+1)-dimensional hyperspherical plane obtained by the converting of the angle vector.

11. A non-transitory computer-readable recording medium having recorded thereon a computer program that, when executed by a computing device, causes the computing device to perform the method according to claim 6.

* * * * *